June 10, 1952  C. L. MERSHON  2,600,313
TEMPERATURE REGULATING SYSTEM
Filed May 8, 1950

WITNESSES:
E. A. McCloskey
Nw. L. Groome

INVENTOR
Clarence L. Mershon.
BY
James R. Ely
ATTORNEY

Patented June 10, 1952

2,600,313

UNITED STATES PATENT OFFICE 2,600,313

TEMPERATURE REGULATING SYSTEM

Clarence L. Mershon, Lima, Ohio, assignor to Westinghouse Electric Corporation, East Pittsburgh, Pa., a corporation of Pennsylvania Application May 8, 1950, Serial No. 160,612

7 Claims. (Cl. 219—20)

This invention relates to regulating systems, and in particular to systems for regulating and controlling the temperature of windows for aircraft. This application is related to Serial No. 150,265, filed March 17, 1950, and having the same inventor and assignee as the present application.

In the aircraft industry, considerable development work has been done in connection with preventing frosting of the windows of the aircraft. Regulating systems of the type disclosed and claimed in my Patent No. 2,462,207, which issued February 22, 1949, have been developed and used as well as a number of others. However, in all of the known systems, an excessive differential in temperature is found between the source of heat in the window and other points in the window when the heating element for the window is first energized, especially when the window and heating element is subjected to severe cold temperatures. Such excessive differential in temperatures is more frequently found when the heating elements for the windows are initially energized.

An object of this invention is to provide in a regulating system for controlling the temperature of a window exposed to various weather conditions and to prevent excessive differentials in temperature throughout the window.

Another object of this invention is to provide in a regulating system for controlling the temperature of a window exposed to various weather conditions, to also control the rate of heating the window to a given temperature.

A more specific object of this invention is to provide, in a system for heating a window, for controlling the rate of input to the window as the window is being heated, and for preventing over-heating of the window.

Figure 1:
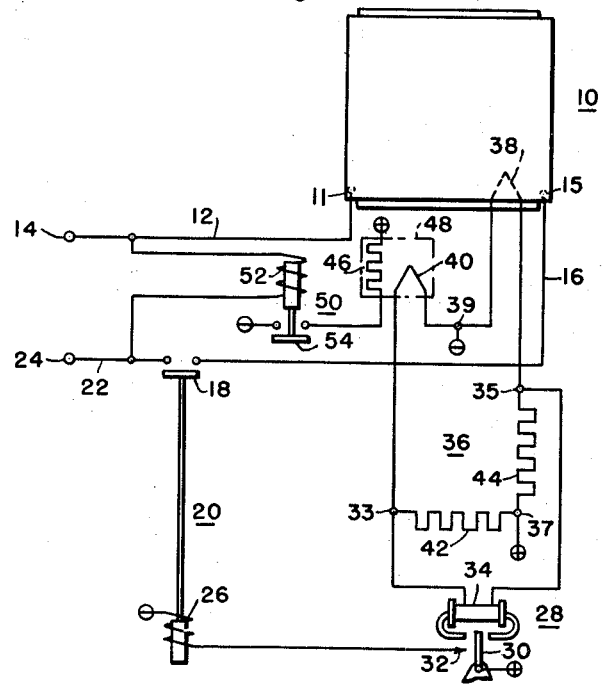
Figure 2:
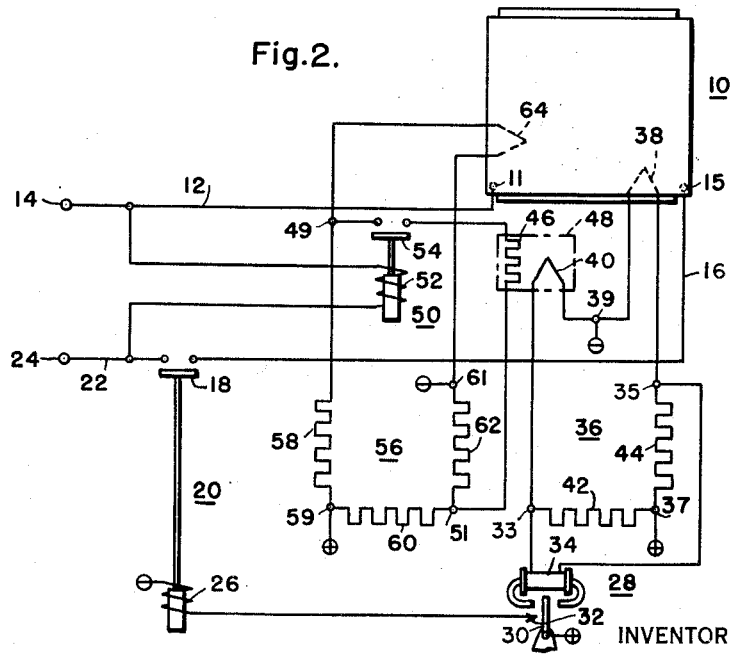

Other objects of this invention will become apparent from the following description when taken in conjunction with the accompanying drawing, in which:

Figures 1 and 2 are diagrammatic views of apparatus and circuits involving the teachings of this invention.

Referring to the drawing, and in particular to Fig. 1 thereof, this invention is illustrated by reference to a system for controlling the temperature of a window pane 10. The window pane 10 is of a well known sandwich type having the heating element (not shown) imbedded therein disposed to be energized for effectively heating the window pane. Such window panes are illustrated in my Patent No. 2,462,207, referred to hereinbefore, and are more fully described in Technical Glass Bulletin No. 15, of the Pittsburgh Plate Glass Company of Pittsburgh, Pennsylvania.

In order to supply current to the heating element (not shown) of the window pane 10, one terminal 11 of the heating element is connected as by a conductor 12 to a terminal 14 of a source of power (not shown), another terminal 15 of the heating element being disposed to be connected through a conductor 16 and a contact member 18 of a contactor 20, and conductor 22 to the other terminal 24 of the source of power (not shown). The contactor 20 is also provided with an energizing winding 26 which is disposed to be energized to control the operation of the contactor 20 to and from a circuit closing position.

In order to control the energization of the winding 26 of the contactor 20, a polarized relay 28 is provided having a pivoted armature contact member 30 disposed to be operated into and out of engagement with a fixed contact member 32 for establishing an energizing circuit for the winding 26. The polarized relay 28 is of the usual construction, being provided with an energizing winding 34 which in this instance is connected across the output terminals 33 and 35 of a resistance bridge circuit 36 to be energized in accordance with the conditions of balance of the bridge circuit 36.

The resistance bridge 36 is composed of a plurality of elements forming the legs thereof, and is connected at the input terminals 37 and 39 thereof to a separate source of power as represented by the positive and negative symbols. In this instance, one leg of the resistance bridge circuit 36 includes a temperature sensitive element 38, whereas another temperature sensitive element 40 is disposed in another leg of the resistance bridge 36. The other legs of the resistance bridge 36 are formed of resistors 42 and 44 which are preferably formed of a material having a low temperature coefficient of resistance, such as Advance, whereas the temperature sensitive elements 38 and 40 are formed of material, such as nickel wire having a high temperature coefficient of resistance. In this instance, the temperature sensitive element 38 is disposed in juxtaposition with respect to the window pane 10 so that the resistance of the temperature sensitive element 38 will vary directly as the temperature of the window pane 10. Preferably, the temperature sensitive element 38 is imbedded between the layers of glass forming the sandwich type of window pane 10 so as to be directly affected by the temperature developed in the window pane.

In the embodiment of this invention illustrated in Fig. 1, the temperature sensitive element 40 is disposed or so associated with an auxiliary heating element 46 as to be directly affected by the temperature of the heating element 46, so as to have a direct effect on the balance of the resistance bridge 36. Where desired, the resistance heating element 46 and the temperature sensitive element 40 may be enclosed in a separate container, as indicated by the dotted lines 48, and may be positioned at any desirable location within the aircraft. The heater element 46 is disposed to be supplied from a separate source of power as indicated by the positive and negative symbols whenever power is supplied from the terminals 14 and 24 to the conductors 12 and 22. Thus, a relay 50 is provided having its energizing winding 52 connected across the conductors 12 and 22, the contact member 54 of the relay 50 being so disposed that when the winding 52 is energized the contact member 54 connects the auxiliary heating element 46 to be energized. It is to be noted that the heating element 46 will thus always be energized as long as the power source is connected to energize the conductors 12 and 22 regardless of whether or not power is supplied to the heating element (not shown) of the window pane 10.

In operation, the temperature sensitive elements 40 and 38 function in the resistance bridge circuit 36 to control the energization and consequently the operation of the polarized relay 28, to thereby control the operation of the contactor 20 to connect the heating element of the window pane which is to be energized. The temperature sensitive element 40 being responsive to the heating of the auxiliary heating element 46 increases its resistance in proportion to the increase in temperture of the auxiliary heating element 46 to so affect the balance of the resistance bridge circuit 36 as to cause an operation of the armature contact member 30 of the polarized relay 28 to engage the contact member 32 to effectively energize the contactor 20 to connect the heating element (not shown) of the window pane 10 to the power source. As long as the temperature of the heating element 46 is above the temperature of the window pane 10, the temperature sensitive element 40 functions to thus maintain the unbalance of the resistance bridge 36 to in effect maintain the contactor 20 in its circuit closing position to supply current to the heating element (not shown) of the window pane 10.

However, if the temperature of the window pane 10 should increase at a rate more rapid than the rate of heating the auxiliary heating element 46, then the resistance of the temperature sensitive element 38 increases at a faster rate than the resistance of the temperature sensitive element 40 to thereby so change the balance of resistance of the resistance bridge circuit 36 as to tend to bring the resistance bridge into balance. Under such conditions, the polarized relay 28 is so energized as to effect a movement of the armature contact member 30 from its contact making position with the fixed contact member 32 to interrupt the energizing circuit for the winding 26 of the contactor 20 to thereby interrupt the energizing circuit for the heating element (not shown) of the window pane 10. Such energizing circuit will be maintained interrupted until the temperature of the auxiliary heating element 46 is so increased that the resistance of the temperature sensitive element 40 again increases to a value above the resistance of the temperature sensitive element 38 to effect the energization of the polarized relay 28 to again cause the armature contact member 30 of the relay 28 to engage the fixed contact member 32 and thereby reestablish the heating circuit for the heating element (not shown) of the window pane 10.

In practice, the auxiliary heating element 46 is preferably formed of oxides of nickel, manganese, and/or cobalt which is commonly known as a thermistor, and has the characteristic that when cold it will have a high temperature coefficient of resistance, but as the element is heated, the temperature coefficient of resistance decreases to the point where it will level off at a predetermined temperature. The resistor element 46 is thus selected so that its leveling off point will be at or near a temperature which it is desired to maintain in the window pane 10. Thus, as the auxiliary heating element 46 is heated to a temperature approximating its leveling temperature, the resistance of the temperature sensitive element 40 will approach a constant so that control of the temperature of the window pane 10 is assumed by the temperature sensitive element 38.

Assuming that the temperature sensitive element 40 has reached its maximum resistance as determined by the heating of the auxiliary heating element 46 to its leveling temperature which corresponds to the temperature to be maintained in the window pane 10, which resistance, in practice, will also be that necessary to maintain a slight unbalance of the resistance bridge circuit 36 to so control the relay 28 as to provide power input to the heating element (not shown) of the window pane 10 at the temperature which is to be maintained within the window pane. If the temperature of the window pane 10 then tends to increase to a value above the predetermined temperature which is to be maintained, the temperature sensitive element 38 functions to effect a change in the slight unbalance of the resistance of the resistance bridge circuit 36 to effect a more perfect balance to thereby change the energization of the relay 28 to effect an operation of the armature contact member 30 thereof to an open circuit position to effectively deenergize the contactor 20 and interrupt the power supply to the heating element (not shown) of the window pane 10.

The temperature sensitive elements 40 and 38 thus cooperate to effectively control the rate of heating of the window pane 10 from a cool temperature to a predetermined temperature which is to be maintained, and the temperature sensitive element 38 thereafter effectively controls the power input to the heating element (not shown) of the window pane 10, thus preventing overheating of the window pane 10. By controlling the rate of heating of the window pane 10 in this manner to effect a gradual heating thereof corresponding to the rate of heating the auxiliary heating element 46, it is found that there are a minimum of differentials in temperatures between different points on the window pane during the initial heating of the window pane 10 to the predetermined temperature. By overcoming such differentials in temperature, damage to the window pane, especially if the window pane is quite cold when heat is first supplied thereto, is overcome, as the gradual change in temperature will not detrimentally affect the window pane.

In the embodiment of this invention illustrated in Fig. 2, the same numerals are employed for identifying like parts of the system illustrated in Fig. 1. The system of Fig. 2 is identical to that of Fig. 1 with the exception that the power supply to the auxiliary heating element 46 is controlled in a different manner. Thus, as illustrated in Fig. 2, the auxiliary heating element 46 is disposed to be connected by the contact member 54 of the relay 50 across the output terminals 49 and 51 of a resistance bridge circuit 56. The resistance bridge circuit 56 is formed of a plurality of resistance elements 58, 60 and 62 of Advance metal having a low temperature coefficient of resistance, the fourth leg of the resistance bridge circuit 56 including a temperature sensitive element 64 having the same characteristics as those of the temperature sensitive elements 40 and 38. In this embodiment, the temperature sensitive element 64 is disposed in juxtaposition with the window pane 10 in the same manner as is the temperature sensitive element 38, but at a point remote therefrom. Power is supplied to the resistance bridge circuit 56 from a separate source represented by the positive and negative symbols at the input terminals 59 and 61 of the bridge.

In the embodiment of Fig. 2, the rate of heating the auxiliary heating element 46 is controlled in accordance with the temperature of the window pane 10. Thus the resistors 58, 60 and 62 are so selected that the bridge circuit 56 is in perfect balance only when the element 64 is at a very low value of resistance, lower than any which is likely to be encountered at the temperatures to which the aircraft is to be subjected. As the window pane 10 is initially heated and the temperature sensitive element 64 is relatively cold and has a low value of resistance, a condition of slight unbalance is established in the resistance bridge circuit 56 whereby a low current flows through the auxiliary heating element 46. However, as the temperature of the window pane 10 increases, the resistance of the temperature sensitive element 64 also increases to effect a greater unbalance in the resistance of the resistance bridge circuit 56, whereby a larger current flows through the heating element 46 to effectively increase the temperature thereof. Thus, the temperature of the rate of rise heating element 46 and consequently the resistance of the temperature sensitive element 40 of the resistance bridge circuit 36 is controlled in such a manner that the rate of rise of the temperature of the window pane 10 is slow under very cold conditions. As the window pane 10 becomes heated and the resistance of the element 64 is increased, the rate of rise in the temperature of the auxiliary heating element 46 becomes more rapid with the result that there is a reduction in the total time necessary for effecting the heating of the window pane 10 to the predetermined temperature. It will, of course, be apparent that the resistance bridge 36 functions in response to the temperature developed by the heating element 46 and the temperature of the window pane 10, in the same manner as that described with reference to the embodiment of Fig. 1 to control the operation of the contactor 20 to control the heating of the heating element (not shown) of the window pane 10.

With the resistance bridge circuit 56 disposed as described hereinbefore for controlling the rate of heating of the auxiliary heating element 46, it will also be apparent that in the case where the window pane 10 is initially relatively warm, the resistance bridge 56 will be greatly unbalanced, by reason of the high resistance of the temperature sensitive element 60, so that a large current will immediately flow to the auxiliary heating element 46 to effect an increase in the rate of heating the element 46 at a faster rate than where the window pane is initially quite cold.

The systems described hereinbefore are very sensitive in operation. The controlling of the rate of rise of the temperature in the window panes prevents the occurrence of excessive differentials in temperature between different points in the window panes. In addition to controlling the rate of rise of the temperature of the window pane, the systems also prevent overheating of the window panes. Further, the systems are formed of standard component elements so that they can be readily reproduced.

I claim as my invention:

1. In a system for controlling the temperature of a window having a resistor heating element associated therewith and disposed to be connected to a source of power, in combination, means disposed to be operated to connect the window heating element to the source of power, an auxiliary heating element having a high temperature coefficient which levels off at a predetermined temperature disposed to be connected to a source of power independently of the operation of the connecting means, a resistance bridge circuit having one temperature sensitive element in one leg thereof disposed in juxtaposition to the window and another temperature sensitive element in another leg thereof disposed in juxtaposition to the auxiliary heating element, and means responsive to predetermined conditions of the resistance balance of the bridge circuit connected to control the operation of the connecting means, said another temperature sensitive element being responsive to the rate of change in temperature of the auxiliary heating element to so control the balance of the resistance bridge circuit as to control the operation of the connecting means to limit the rate of rise of the temperature of the window to a predetermined rate, said one temperature sensitive element cooperating to so control the balance of the resistance bridge circuit as to control the operation of the connecting means to prevent overheating of the window.

2. In a system for controlling the temperature of a window having a resistor heating element associated therewith and disposed to be connected to a source of power, in combination, a contactor disposed to be energized to connect the window heating element to the source of power, an auxiliary heating element having a high temperature coefficient which levels off at a predetermined temperature disposed to be connected to a source of power independently of the energization of the contactor, a relay disposed for operation to control the energization of the contactor, and a resistance bridge circuit connected to control the operation of the relay in accordance with the resistance balance of the bridge circuit, the resistance bridge circuit having one temperature sensitive element in one leg thereof disposed in juxtaposition to the window and another temperature sensitive element in another leg thereof disposed in juxtaposition to the auxiliary heating element, said another temperature sensitive element being responsive to the rate of change in temperature of the auxiliary heating element to so control the balance of the resistance bridge circuit as to control the energization of the contactor to thereby limit the rate of rise of the temperature of the window to a predetermined rate, said one temperature sensitive element cooperating in the bridge circuit to so control the resistance balance thereof as to control the energization of the contactor to prevent overheating of the window.

3. In a system for controlling the temperature of a window having a resistor heating element associated therewith and disposed to be connected to a source of power, in combination, means disposed to be operated to connect the window heating element to the source of power, an auxiliary heating element which will pass current in two directions independent of the window heating element, said auxiliary heating element having a high temperature coefficient which levels off at a predetermined temperature, a resistance bridge circuit having one temperature sensitive element in one leg thereof disposed in juxtaposition to the window whereby the resistance of said one leg varies in accordance with the temperature of the window and another temperature sensitive element in another leg thereof disposed in juxtaposition to the auxiliary heating element whereby the resistance of said another leg varies in accordance with the temperature of the auxiliary heating element, means responsive to predetermined conditions of resistance balance of the bridge circuit connected to control the operation of the connecting means, and means for connecting the auxiliary heating element to a source of power to initiate the heating thereof prior to an operation of the connecting means to connect the window heating means to the source of power, said another temperature sensitive element being responsive to the heating of the auxiliary heating element to so affect the balance of the resistance bridge circuit as to control the operation of the connecting means to limit the rate of rise of the temperature of the window to a predetermined rate, said one temperature sensitive element cooperating to so control the balance of the resistance bridge circuit as to control the operation of the connecting means to prevent overheating of the window.

4. In a system for controlling the temperature of a window having a resistor heating element associated therewith and disposed to be connected to a source of power, in combination, means disposed to be operated to connect the window heating element to the source of power, an auxiliary heating element which will pass current in two directions independent of the window heating element, said auxiliary heating element having a high temperature coefficient which levels off at a predetermined temperature, a resistance bridge circuit having one temperature sensitive element in one leg thereof disposed in juxtaposition to the window whereby the resistance of said one leg varies in accordance with the temperature of the window and another temperature sensitive element in another leg thereof disposed in juxtaposition to the auxiliary heating element whereby the resistance of said another leg varies in accordance with the temperature of the auxiliary heating element, means responsive to predetermined conditions of resistance balance of the bridge circuit connected to control the operation of the connecting means, and means for connecting the auxiliary heating element to a source of power to initiate the heating thereof prior to an operation of the connecting means to connect the window heating means to the source of power, said another temperature sensitive element and said one temperature sensitive element cooperating in the resistance bridge circuit to so affect the balance thereof as to effect the operation of the connecting means to connect the window heating element to the source of power only when the temperature of the window is below the temperature of the auxiliary heating element, said one temperature sensitive element also cooperating in the resistance bridge circuit to control the operation of the connecting means to prevent overheating of the window.

5. In a system for controlling the temperature of a window having a resistor heating element associated therewith and disposed to be connected to a source of power, in combination, means disposed to be operated to connect the window heating element to the source of power, an auxiliary heating element independent of the window heating element, a first resistance bridge circuit having one temperature sensitive element in one leg thereof disposed in juxtaposition to the window and another temperature sensitive element in another leg thereof disposed in juxtaposition to the auxiliary heating element, a second resistance bridge circuit having a third temperature sensitive element in a leg thereof disposed in juxtaposition to the window, the auxiliary heating element being connected across the second resistance bridge circuit to be heated in accordance with the condition of resistance balance thereof depending upon the temperature of the window sensed by the third temperature sensitive element, and means responsive to predetermined conditions of the resistance balance of the first resistance bridge circuit connected to control the operation of the connecting means, said another temperature sensitive element being responsive to the rate of change in temperature of the auxiliary heating element to so control the balance of the first resistance bridge circuit as to control the operation of the connecting means to limit the rate of rise of the temperature of the window to a predetermined rate, said one temperature sensitive element cooperating to so control the balance of the first resistance bridge circuit as to control the operation of the connecting means to prevent overheating of the window.

6. In a system for controlling the temperature of a window having a resistor heating element associated therewith and disposed to be connected to a source of power, in combination, a contactor disposed to be energized to connect the window heating element to the source of power, an auxiliary heating element, a relay disposed for operation to control the energization of the contactor, a first resistance bridge circuit connected to control the operation of the relay in accordance with the resistance balance of the bridge circuit, and a second resistance bridge circuit having a temperature sensitive element in a leg thereof disposed in juxtaposition to the window, the auxiliary heating element being connected across the second resistance bridge circuit to be heated in accordance with the condition of resistance balance thereof depending upon the temperature of the window sensed by the temperature sensitive element, the first resistance bridge circuit having one temperature sensitive element in a leg thereof disposed in juxtaposition to the window and another temperature sensitive element in another leg thereof disposed in juxtaposition to the auxiliary heating element, said another temperature sensitive element being responsive to the rate of change in temperature of the auxiliary heating element to so control the balance of the first resistance bridge circuit as to control the energization of the contactor to thereby control the rate of rise of the temperature of the window, said one temperature sensitive element cooperating in the first resistance bridge circuit to so control the resistance balance thereof as to control the energization of the contactor to prevent overheating of the window.

7. In a system for controlling the temperature of a window having a resistor heating element associated therewith and disposed to be connected to a source of power, in combination, means disposed to be operated to connect the window heating element to the source of power, a relay disposed for operation to control the operation of the connecting means, a resistance bridge circuit connected to another source of power, the resistance bridge circuit having a temperature sensitive element in a leg thereof disposed in juxtaposition to the window, an auxiliary heating element disposed to be connected across the resistance bridge circuit to be heated at a variable rate depending upon the temperature of the window, another resistance bridge circuit connected to a source of power and disposed to control the operation of the relay in accordance with the balance of said another resistance bridge circuit, said another bridge circuit having one temperature sensitive element in one leg thereof disposed in juxtaposition to the window whereby the resistance of said one leg varies in accordance with the temperature of the window and another temperature sensitive element in another leg thereof disposed in juxtaposition to the auxiliary heating element whereby the resistance of said another leg varies in accordance with the temperature of the auxiliary heating element, said another temperature sensitive element and said one temperature sensitive element cooperating in said another resistance bridge circuit to control the operation of the connecting means to connect the window heating element to the source of power only when the temperature of the window is below the temperature of the auxiliary heating element, said one temperature sensitive element also cooperating in said another resistance bridge circuit to control the operation of the connecting means to prevent overheating of the window.

CLARENCE L. MERSHON.

REFERENCES CITED

The following references are of record in the file of this patent:

UNITED STATES PATENTS

| Number | Name | Date |
| --- | --- | --- |
| 1,715,750 | Gano | June 4, 1929 |
| 1,896,856 | Traver | Feb. 7, 1933 |
| 2,206,715 | Burat | July 2, 1940 |
| 2,236,624 | Littwin | Apr. 1, 1941 |
| 2,290,091 | Brown et al. | July 14, 1942 |
| 2,429,453 | Crowley | Oct. 21, 1947 |
| 2,507,036 | McCrumm et al. | May 9, 1950 |